Jan. 18, 1927.
S. DELLAGALA
SPRAYING DEVICE
Filed Sept. 2, 1924
1,614,777
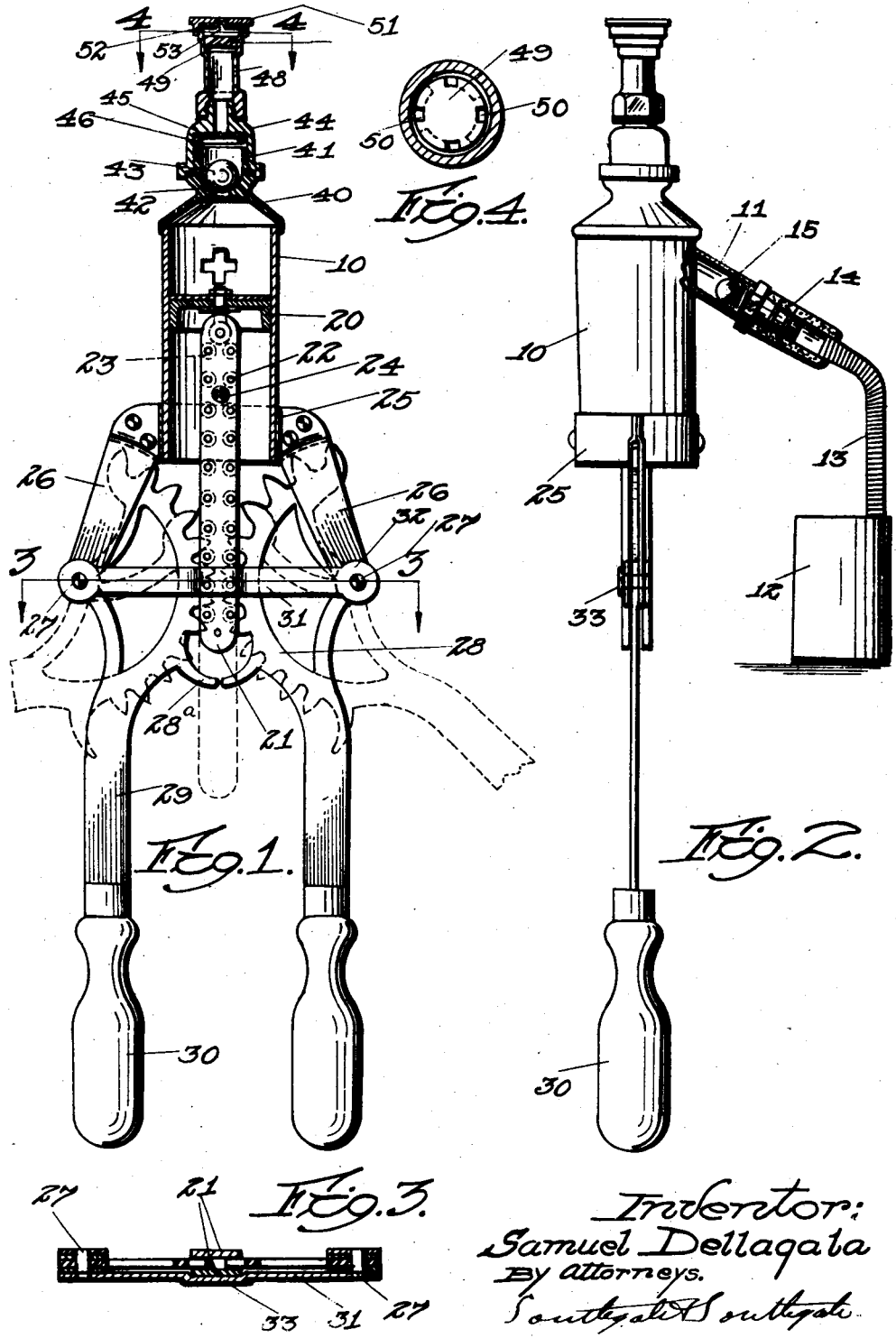
Inventor:
Samuel Dellagala
By attorneys.

Patented Jan. 18, 1927.

1,614,777

UNITED STATES PATENT OFFICE.

SAMUEL DELLAGALA, OF WORCESTER, MASSACHUSETTS.

SPRAYING DEVICE.

Application filed September 2, 1924. Serial No. 735,260.

This invention relates to a device for spraying purposes. It can be used in spraying insecticides on trees or even for spraying paint, white-wash and other liquids.

The principal objects of the invention are to provide a frame for supporting the operating mechanism of a more solid, substantial, and durable construction than has been the case heretofore; to provide a positive stop for preventing the disengagement of the operating gears on the opening of the handles, and to provide an improved nozzle with interchangeable parts for producing a fine spray when desired and other improvements in the nozzle, as will appear.

Reference is to be had to the accompanying drawings, in which—

Fig. 1 is a central longitudinal sectional view of the nozzle and pump chamber with the operating parts in elevation;

Fig. 2 is an edge or side elevation of the same showing its connection with the source of supply, partly in section;

Fig. 3 is a sectional view on the line 3—3 of Fig. 1, and

Fig. 4 is an enlarged sectional view on the line 4—4 of Fig. 1, illustrating a feature of the nozzle.

I have shown the invention as applied to that type of spraying device comprising a cylindrical chamber 10 connected by a spout 11 with a source of supply 12 in the form of an enclosed can, barrel or other container. This container is connected by a flexible hose 13 and a removable connection 14 with the spout 11 and a ball valve 15 is shown here for closing the connection so that liquid cannot flow back into the container when pressure is applied in the cylinder 10.

In the cylinder 10 is a piston 20 pivotally connected with a piston rod 21. This piston rod consists of two side pieces connected together by studs or pins 22, each having a roll 23 thereon. These rolls are arranged in two lines parallel with each other and arranged vertically in the drawing shown to constitute a double rack. The piston rod is also supplied with a positive stop pin 24.

On the bottom of the cylinder 10 there is a ring 25 securely attached thereto which constitutes a support for a frame comprising two diverging arms 26. Each one of these arms is bifurcated and is provided with a pivot 27 at the bottom. On these pivots are mounted a pair of cog wheel segments 28 passing through the spaces between the bifurcations of the arms 26. Each segment is provided with a stop 28ª and with an extension 29 having on the end a handle 30. The teeth of these cog wheel segments engage the rolls 23 on the two sides of the piston rod 21 and operate to reciprocate the piston in a manner that will be obvious from the full and dotted lines in Fig. 1.

In order to strengthen the frame I place across it a tie 31 connected with the bottoms of the arms 26 to rigidly hold them together and also having two circular enlargements 32 at the ends for receiving the pivot pins 27. This brace or tie is bent outwardly at 33 to provide a space for the piston rod 21 and a guide for it. This constitutes a rigid structure. The stop 24 comes down when the piston rod is lowered so as to project between the ends of the last two teeth and positively prevent the teeth from being disengaged from the rack formed by the rolls 23.

The top of the cylinder 10 is provided with a removable cap 40 which has an external screw thread 41 at the top and an inwardly extending flange or valve seat 42 at a distance below having a perforation through it. This is to support a ball valve 43. Screwing on the screw thread 41 is another detachable cap member 44 which has a chamber therein for receiving the valve 43 and is provided with a spider 45 having openings therein located at the top and held in by a wire spring 46 to prevent motion of the valve up into the parts above.

On top of the cap 44 is screwed the nozzle 48. This nozzle is provided near the top with a chamber in which is a removable spray disc 49. This plate is a solid disc having a series of inclined passages 50 in its edge. These are all inclined around in the same direction for the purpose of providing a whirl spray. The top of the nozzle is closed by a cap 51 having a perforation in the center through which the water is discharged. Under this cap is located a plate 52 having a conical projection 53 perforated in the center. This plate 52 is detachable and exchangeable for a plate having a perforation of a different size so as to regulate the size of the stream. When the spray disc is employed this stream is broken up into a whirl spray.

In the operation of the device the handles are brought out to the dotted line position shown in Fig. 1 which draws out the piston nearly to the end of the cylinder 10. That action closes the valve 43 on its valve seat 42 by the action of air pressure beyond it and it opens the valve 15 by the suction through the branch 11 and draws the liquid in from the container 12 to the cylinder 10. The handles cannot be moved out far enough away from each other to disengage the rack from the gear segments on account of the stop 24 coming between the last two or upper teeth on the two segments.

Now the operator pushes in on the handles 30 to bring them to the position shown in full lines in Fig. 1. This raises the piston, forces up the valve 43 against the perforated spider above to allow the liquid to pass out rapidly. It also forces the ball 15 back against its seat so that the liquid cannot pass back into the container 12. On account of the reduction in size of the outlet from the cylinder the spray will be ejected with a great deal of force and the leverage of the handles 30 is sufficient to secure what is a remarkable stream or spray from a hand device of this character. The stops 28ª prevent the piston being forced far enough to bind or injure the parts.

It will be seen that I have provided important improvements in the nozzle itself to permit of producing a fine spray and wide distribution and yet with very little difficulty the character of the spray and the size of the stream can be varied at will. The operating part is also improved by means of the brace or tie 31 and its cooperation with the arms 26 and the rack or piston rod 21. The stop 24 cooperates with the segmental racks to prevent their disengagement with each other, which naturally saves considerable time because when they do get disengaged it requires a good deal of time to reassociate them in relative position.

Although I have illustrated and described only one form of the invention I am aware of the fact that modifications can be made therein by any person skilled in the art without departing from the scope of the invention as expressed in the claims. Therefore, I do not wish to be limited to the details herein shown and described but what I do claim is:—

1. The combination with a single acting cylinder and piston, of a rack pivotally connected with the piston for operating it, said rack having a double row of rolls along its opposite sides, and a pair of cog wheel segments located opposite each other and meshing with the two racks, pivots on opposite sides thereof on which said segments are pivoted, each segment having a handle, said handles extending from the segments parallel with each other when the piston is raised.

2. The combination of a cylinder and piston, a frame connected with one end of the cylinder and comprising two arms projecting outwardly therefrom, a pair of pivots on said arms, a pair of cog wheel segments pivoted on said arms and projecting toward each other, a tie extending across from one of said arms and pivots to the other to strengthen the frame, a double rack transverse to said tie pivotally connected with the piston and meshing with the two cog wheel segments, and a pair of handles on said segments for operating the piston.

3. The combination of a cylinder and piston, a frame connected with one end of the cylinder and comprising two arms projecting outwardly therefrom, a pair of pivots on said arms, a pair of cog wheel segments pivoted on said arms and projecting toward each other, and a double rack pivotally connected with the piston and meshing with the two cog wheel segments for operating the piston, and the rack having a cross pin thereon in position to come between the last two teeth of the two segments to prevent the segments being turned so far as to come out of mesh with the racks.

4. The combination of a cylinder and piston, a frame connected with one end of the cylinder and comprising two arms projecting outwardly therefrom, a pair of pivots on said arms, a pair of cog wheel segments pivoted on said arms projecting toward each other, a double rack pivotally connected with the piston and meshing with the two cog wheel segments for operating the piston, a tie connected with said arms and pivots to strengthen the frame and offset at the center to receive the rack, and handles on the segments for operating them.

In testimony whereof I have hereunto affixed my signature.

SAMUEL DELLAGALA.